United States Patent

Gupta et al.

[11] Patent Number: 5,907,386
[45] Date of Patent: May 25, 1999

[54] METHOD OF MANUFACTURING A PROGRESSIVE OPTIC

[75] Inventors: Amitava Gupta, Bethesda, Md.; Ronald D. Blum, Roanoke, Va.

[73] Assignee: Innotech, Inc., Roanoke, Va.

[21] Appl. No.: 08/954,052

[22] Filed: Oct. 17, 1997

Related U.S. Application Data

[62] Division of application No. 08/715,110, Sep. 17, 1996, Pat. No. 5,847,803.

[51] Int. Cl.[6] ................... G02C 7/06; G02B 1/00
[52] U.S. Cl. ................ 351/177; 351/161; 351/169; 351/172; 359/652
[58] Field of Search ............. 351/160 R, 160 H, 351/161, 168, 172, 169, 177; 359/652, 653, 654

[56] References Cited

U.S. PATENT DOCUMENTS

| | | | |
|---|---|---|---|
| 2,878,721 | 3/1959 | Kanolt | 351/169 |
| 3,687,528 | 8/1972 | Maitenaz | 351/169 |
| 4,056,311 | 11/1977 | Winthrop | 351/169 |
| 4,240,719 | 12/1980 | Guilino et al. | 351/169 |
| 4,315,673 | 2/1982 | Guilino et al. | 351/169 |
| 4,418,992 | 12/1983 | Davenport et al. | 351/169 |
| 4,472,036 | 9/1984 | Kitani | 351/169 |
| 4,606,622 | 8/1986 | Fueter et al. | 351/169 |
| 4,806,010 | 2/1989 | Ewer et al. | 351/169 |
| 4,952,048 | 8/1990 | Frieder et al. | 351/177 |
| 5,042,936 | 8/1991 | Guilino et al. | 351/169 |
| 5,095,079 | 3/1992 | Yean et al. | 526/60 |
| 5,123,725 | 6/1992 | Winthrop | 351/169 |
| 5,148,205 | 9/1992 | Guilino et al. | 359/652 |
| 5,200,858 | 4/1993 | Hagerty et al. | 359/653 |
| 5,258,144 | 11/1993 | Yean et al. | 264/1.7 |
| 5,270,745 | 12/1993 | Pedrono | 351/169 |
| 5,305,028 | 4/1994 | Okano | 351/169 |
| 5,446,508 | 8/1995 | Kitchen | 351/169 |

*Primary Examiner*—Scott J. Sugarman

[57] ABSTRACT

A progressive optic has an optical preform wherein the radius of curvature of the surface is altered by forming discrete spherical portions across the surface. A thin intermediate layer, having a different refractive index from the optical preform, is then cast over the formed optical preform surface. The optical preform having the thin intermediate layer is then cast with a resin superstrate layer which restores the curve of the optic. Each spherical section, defined by the spherical portions and corresponding portions of the outer surface of the superstrate layer, alters the spherical power of the adjacent spherical section by about 0.03 D to 0.05 D.

10 Claims, 3 Drawing Sheets

METHOD OF MANUFACTURING A PROGRESSIVE OPTIC

This is a request for filing a divisional application under 37 C.F.R. § 1.60 of prior application Ser. No. 08/715,110, filed on Sep. 17, 1996 for "OPTIC INCORPORATING A POWER GRADIENT" (as amended) now U.S. Pat. No. 5,847,803.

FIELD OF THE INVENTION

This invention relates to optics having a power gradient, and more particularly to optics having an optical preform with a plurality of nested, concentric spherical portions formed on the surface of the preform.

BACKGROUND OF THE INVENTION

The term optics includes semi-finished lens blanks, monofocal or multifocal lenses, and finished optical lenses incorporating a wide variety of known lens designs. An optic such as a progressive addition lens is preferred to a bifocal optic because the progressive addition optic provides a channel in which the add power changes continuously while adding only a relatively small level of astigmatism, so that the quality of the image formed by the transition zone remains acceptable. In addition, the front surface of the progressive addition optic remains continuous and smooth, causing the transition zone to remain substantially invisible. This continuous transition from one sagital radius of curvature to a smaller radius inevitably introduces a difference between the sagital to the tangential radii of curvature, which appears as unwanted astigmatism. In order to have a successful progressive addition optical design, it is important to minimize the unwanted astigmatism along the central meridional line which connects the major reference point to the center of the add power zone. Previously, this problem has been approached analytically and by application of finite element analysis. Progressive designs embodying one or more umbilical lines have been proposed. Splines as well as conic sections have been applied to model the surface geometry. Current designs of progressive addition optics contain the deficiencies inherent in the selected design methodology, i.e., a narrow progressive addition channel in which unwanted astigmatism is held to less than 0.25 D, appearance of unwanted astigmatism in the periphery of the optic which reduces the field of view, existence of refractive errors, etc.

Refractive index gradients have previously been used in order to develop a transition of spherical power. For example, Guilino (U.S. Pat. Nos. 4,240,719, 5,148,205 and 5,042,936), in a process uniquely applicable to mineral glass, discloses forming continuous refractive gradients ($n=f\{z\}$) to construct a continuous progressive addition surface in which the gradient is introduced by means of ion implantation or exposure of the optic to a solution capable of diffusing heavy ions into the material of the optic. Guilino demonstrated that it is possible to reduce the difference between the sagital and tangential radii of curvatures while varying the rate of change of the sagital radius of curvature by introducing an additional function which controls the variation of refractive index sagitally. However, unwanted astigmatism is not eliminated and refractive errors develop at relatively low values of the angle of vision because the design of the refractive gradient, as well as the process of achieving the refractive index gradient, yields plane surfaces of constant refractive indices (i.e., $n(z)=f(z)$) in order to achieve a continuous surface with continuous first and second derivatives with respect to the sagital depth.

SUMMARY OF THE INVENTION

A multifocal optic, being of a progressive nature, is provided which substantially eliminates unwanted astigmatism. The progressive optic has an optical preform with a base spherical power, an intermediate resin layer and a superstrate resin layer. The add power zone of the optical preform has a series of nested, substantially concentric, spherical portions formed into the surface of the optical preform and having progressively varying posterior radii. The surface area of the optical preform having the spherical portions is coated with a thin, continuous, intermediate layer of a polymeric resin. The resin in the intermediate layer has a refractive index which is no more than about 0.05 units higher than the refractive index of the optical preform material. A superstrate layer is applied adjacent the intermediate layer to restore the curve of the optic. The superstrate layer has a desired refractive index, so that the final surface is continuous with, and has the same radius of curvature as, the distance power zone of the finished optic.

DETAILED DESCRIPTION OF THE INVENTION

Figure 1:
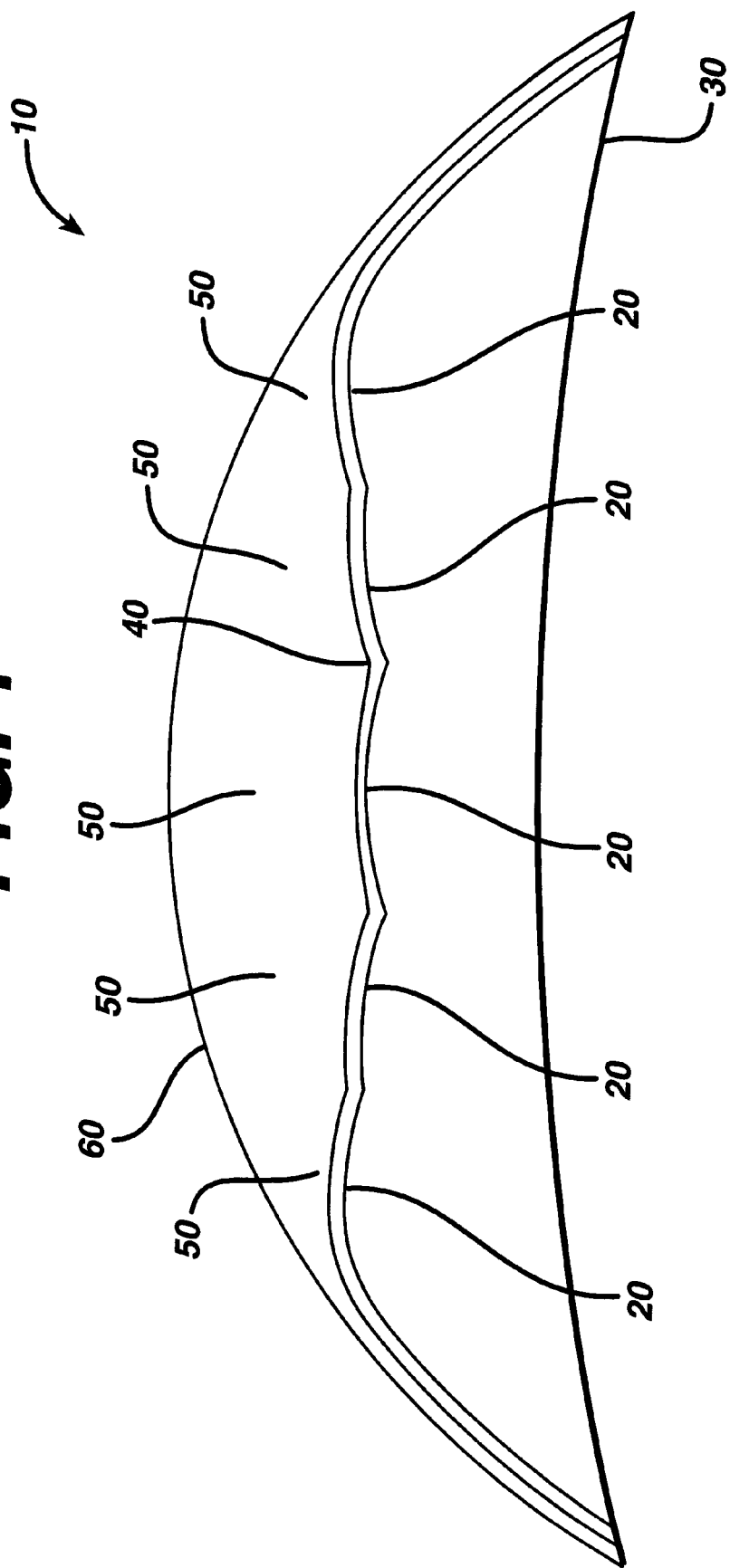
FIG. 1 is a cross-sectional view of an optic according to the present invention.
Figure 2:
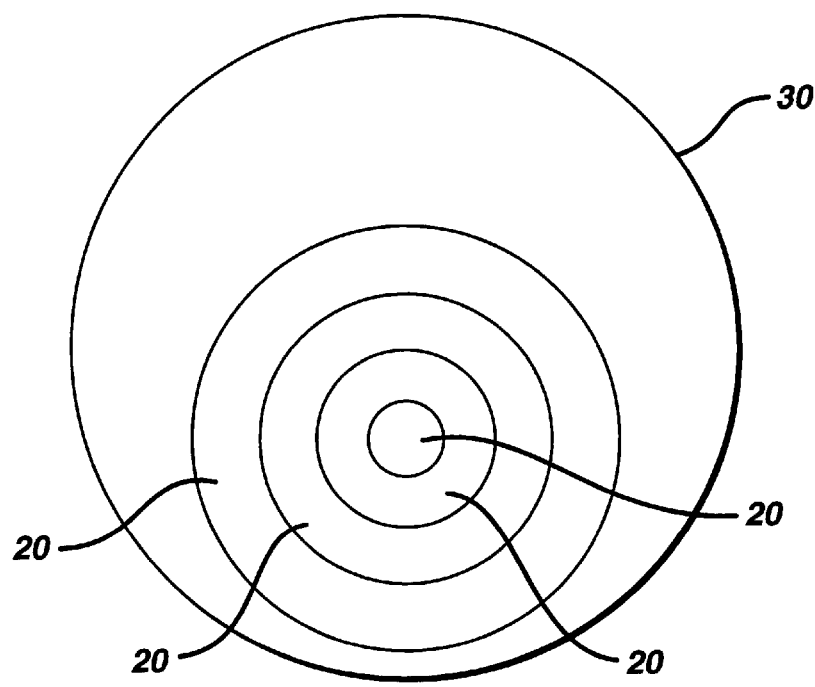
FIG. 2 is a top view of an optical preform.

As illustrated in FIGS. 1 and 2, the optic 10 of the present invention includes of a series of spherical portions 20 formed on an optical preform 30, wherein the spherical portions 20 have progressively varying radii of curvature. The spherical portions 20 are covered with a thin, intermediate resin layer 40. A superstrate resin layer 60 is then applied to the intermediate layer 40 to form spherical sections 50, each spherical section 50 being defined by a spherical portion 20 and a corresponding portion of the outer surface of the superstrate layer 60. The refractive indices of each of the spherical sections 50 is higher than the refractive index of the optical preform 30. This structure would normally be expected to provide a stepwise gradient in spherical power of the optic and would be expected to exhibit a series of lines similar to a fused trifocal lens. However, in the present invention, the change of spherical power in the add power zone is controlled by altering the progressive variation of the radii of curvature of the individual spherical sections 50 the refractive index of the intermediate resin layer 40 and the superstrate resin layer 60 used to cast the add power zone. The transition in spherical power is made continuous, and the boundaries between adjacent spherical portions 20 concealed, by coating the entire formed surface with the intermediate resin layer 40 having a refractive index which is a maximum of about 0.05 units higher than the refractive index of the optical preform 30. Thus, a refractive index gradient is developed between the optical preform 30 and the superstrate resin layer 60. The centers of the curvatures of the spherical portions 20 are selected along a curve designed to minimize the displacement of the image relative to its location when formed by the major reference point.

The spherical sections 50 provide a smooth transition between the base and the add power of the optic. For best results, each spherical section 50 alters the spherical power of the adjacent spherical section 50 by about 0.03 D to 0.05 D, although steps of up to about 0.06 D each may be acceptable. Due to the presence of the refractive index gradient between the intermediate resin layer 40 and the superstrate resin layer 60, the spherical power profile of the finished optic 10 has the appearance of a smoothly rising function, and does not show discrete jumps of spherical power. If an overall add power of approximately 3.00 D is to be accommodated within a channel of 12 mm, then each spherical section should have a width of about 0.12–0.20 mm. The difference of sag heights for 0.03 D steps, represented by adjacent spherical sections 0.12 mm wide, amounts to about 5 microns. The maximum depth of the cavity for the superstrate resin layer 60 is about 500 microns for an add power zone of 3.00 D. The depth of the cavity depends upon the refractive index of the intermediate resin layer 40, the refractive index of the optical preform 30, the add power required to be provided, and the channel length specified by the optical design to provide the transition in spherical power, and the size of the add power zone.

The surface of the spherical portions 20 are coated with an intermediate resin layer 40 which has a refractive index approximately 0.03 to 0.05 units higher than the refractive index of the optical preform 30 material. The thickness of the intermediate resin layer 40 will be about 1–2 microns. The intermediate resin layer 40 is partially polymerized in order to develop a continuous coating over the boundaries of the spherical sections 20. The intermediate resin layer 40 also develops a refractive index gradient with a superstrate resin layer 60, and thus renders the interface between the two layers substantially invisible. The resin superstrate layer 60 is polymerized in order to develop the mechanical, optical and thermal properties required for the anterior surface of the final optic 10.

The method of the present invention may be used to develop a transition zone extending from about 10.0 mm to 15.0 mm, culminating in an add power zone which may exceed 25 mm in diameter. In one approach, the transition zone is spherically symmetrical, i.e., the length of the transition zone will be the same in all meridians. In a second approach, the transition zone can be altered in length or geometry at the periphery of the lens, and can be made shorter in the nasal side. As the transition zone is shortened, the image strength for intermediate powers is lessened. However, better image resolution will be provided than conventional designs, since there will be little, if any, unwanted astigmatism.

The spherical portions 20 on the optical preform 30 may be formed by a variety of known techniques such as machining the optical preform, or molding the optical preform using a mold possessing the requisite surface contours. The portions 20 may also be etched on the surface by a variety of techniques including chemical (e.g., laser), or plasma assisted etching processes.

If the optic is a finished (spherical, aspheric or toric) monofocal lens, the refractive gradient may be formed on either surface of the optic. Alternatively, the optic may be a semi finished blank, which can accommodate the refractive gradient on the front surface of the blank. In this case, the posterior surface may be ground to prescription, as is done with conventional progressive addition lenses. Alternatively, the posterior surface may be ground to the spherical correction desired, and the toric power may be cast on using a mold having a matching base curvature and a specified toric curvature, as described below.

Figure 3:
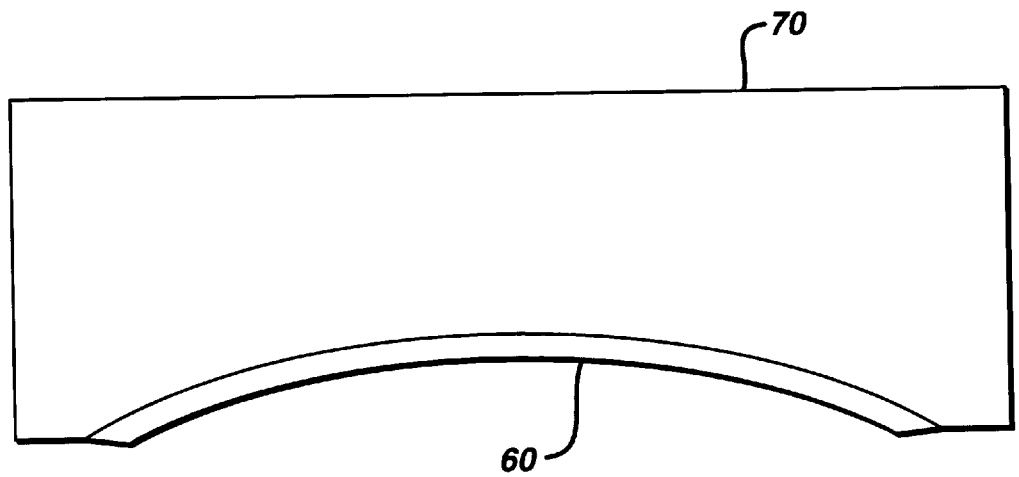
FIG. 3 is a cross-sectional view of a partially polymerized resin superstrate layer attached to a mold.

According to a preferred embodiment, the superstrate resin layer 60 is provided as an attached layer to a mold 70, as shown in FIG. 3. The mold 70 may be either reusable or disposable. The superstrate layer 60 is partially polymerized and includes components which are monofunctional, so that a non cross-linked gel is formed having a glass transition temperature in the range of about 20–65° C., and preferably in the range of about 40–50° C. Additional polymerizable components are diffused into the resin layer to further polymerize and cross link the resin layer, raise the glass transition temperature higher than 75° C., bring the refractive index to its final designated level, and render the anterior surface scratch resistant. The second polymerization process may be activated by heat, light, or both. The additional polymerizable component may be dipentaerethrytol pentacrylate or any of a variety of suitable polymerizable components such as di- or tri-functional methacrylates or acrylates.

In another preferred embodiment, semi-finished blanks or monofocal lenses, which are spherical and have refractive index gradients, may be made and stocked in large batches, incorporating refractive index gradients on the anterior (convex) surface developed along any meridian. These optics include all possible combinations of spherical and add powers needed to serve a substantial portion of the vision of the population requiring vision correction, for example, 287 skus (stock keeping units) to cover a spherical power range of +4.00 D to –4.00 D, and an add power range of 1.00 D to 3.00 D. The spherical power is altered by altering the anterior (convex) curve in these optics, while maintaining the posterior (concave) curve fixed within a broad range of spherical powers. For example, it may be possible to cover the range of +4.00 D to –4.00 D by using three posterior (concave) curves. The optics are then finished to prescription by casting the desired toric power on the posterior surface, taking care to set the toric axis according to prescription. The toric power is cast by placing a toric mold convex side down on the concave surface of the optic. The mold is selected to match its base curve to the posterior curve of the optic. The toric axis of the mold is set to a specific angle for a desired prescription, before filling the space between the mold and the optic with a polymerizable resin formulation. This resin is subsequently polymerized to develop the desired toric curve on the concave surface of the optic.

Figure 4:
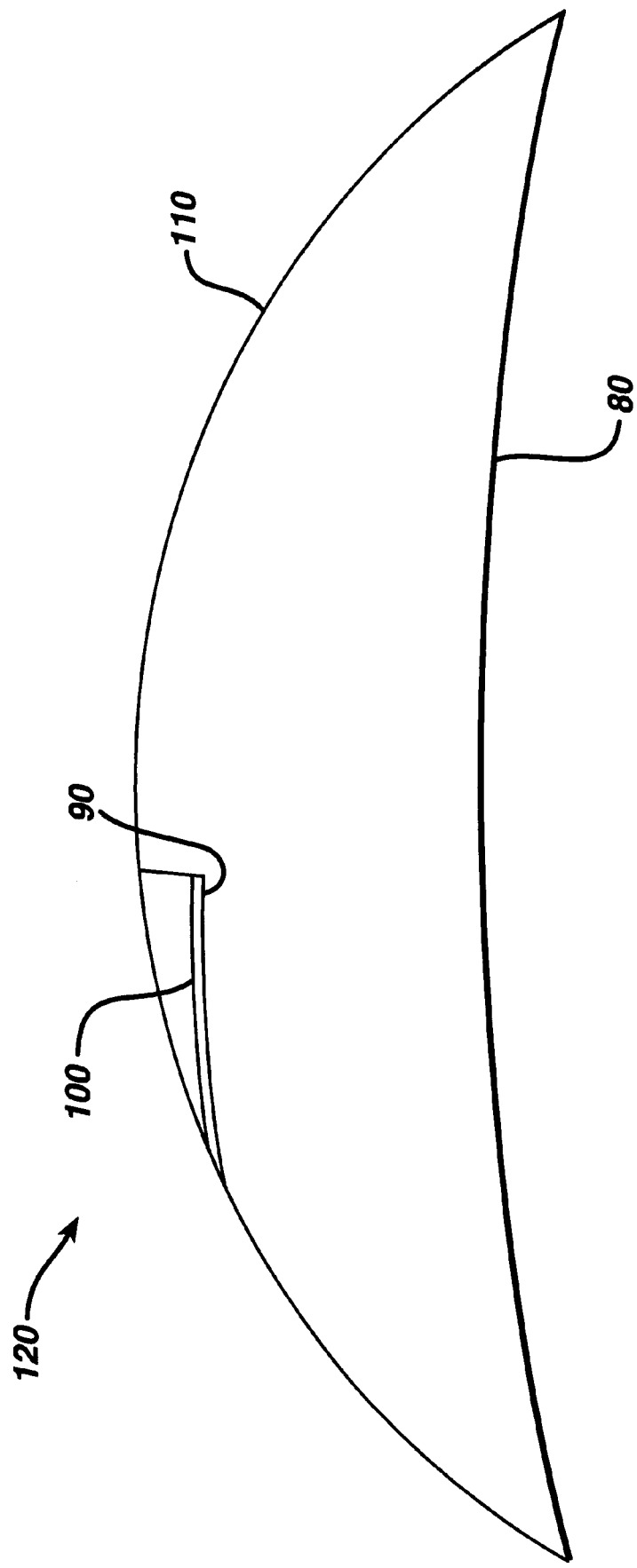
FIG. 4 is a cross-sectional view of another embodiment of an optic according to the present invention.

Refractive index gradients may also be used to develop substantially invisible bifocal or trifocal lenses, in which the line of the segment is left visible, but the radial line delineating the add power zone is rendered substantially invisible. As shown in FIG. 4, a monofocal lens or a semi finished blank 80 is machined to form the cavity 90 needed to develop an add power zone. The cavity 90 is coated with a thin (approximately 2–3 microns) resin intermediate layer 100 having a refractive index about 0.03 to 0.05 units higher than the refractive index of the semi-finished blank 80. This thin intermediate layer 100 is then polymerized in-situ. The intermediate resin layer 100 forms a continuous coating on the edge of the cavity 90. A superstrate resin layer 110 is cast over the polymerized intermediate layer 100 restoring the anterior curvature of the optic 120 and forming the add power zone. The intermediate resin layer 100 may be left partially polymerized in order to develop a refractive gradient with the superstrate layer 110.

The formation of a refractive index gradient in an optic is illustrated by means of the following example.

EXAMPLE

A spherical lens made of Diethylene Glycol bis Allyl Carbonate (CR-39®) is provided having an optical diameter of 76 mm, a concave curvature of 4.10 D, convex curvature of 6.10 D, an edge thickness of 0.7 mm, no toric power, and a measured spherical power of 2.03 D at the optical center. The lens is mounted on a block and machined on the anterior (convex) surface to generate a series of 150 spherical portions, each having a width of about 90 microns. The first spherical portion has a curve of 5.94 D and the last spherical portion has a curve of −2.00 D. The last spherical portion has a meridional length of 25 mm. The change in curvature between two adjacent spherical portions is 0.055 D. This lens is then mounted on a chuck in an ultrasonic spray chamber which has been thoroughly flushed with dry nitrogen gas. To form an intermediate resin layer, the lens is subjected to a photo-polymerizable monomer resin spray which is generated ultrasonically. The refractive index of the liquid resin before polymerization is 1.51 and is 1.54 after polymerization. The droplet size is carefully controlled to be about 1.0 micron. The thickness of the applied coating is about 2 microns. The intermediate layer is exposed to ultraviolet radiation in the 360–380 nm range and is partially polymerized in about 2 seconds.

The coated lens is then contacted with a glass mold having a concave curvature equal to 6.00 D. The mold is transparent to ultraviolet radiation in the wavelength range of 350–400 nm. The space between the lens and the mold is filled with a photopolymerizable monomer resin formulation with a refractive index of 1.58 before polymerization. The resin formulation polymerizes to form a hardened resin superstrate layer having a refractive index of 1.60. The mold assembly is placed in a photocuring chamber and exposed to ultraviolet radiation in the wavelength range of 360–400 nm. Once the polymerization of the superstrate resin layer is completed, the mold assembly is withdrawn from the chamber and demolded. The resultant lens is a progressive addition lens having a base power of 2.03 D, an add power equal to 2.00 D, with an add power zone of 25 mm in diameter and a channel length of 13.5 mm.

The resin formulation for the intermediate layer is composed of: Diethyl Glycol bis Allyl Carbonate, 65% w/v; alkoxylated aliphatic diacrylate ester, 12% w/v; Furfuryl acrylate, 12% w/v; ethoxylated bisphenol A Diacrylate, 9% w/v; and a photoinitiator, 2%, w/v. The resin formulation for the superstrate layer is composed of: ethoxylated bisphenol A Diacrylate, 51% w/v; styrene, 20% w/v; alkoxylated aliphatic diacrylate ester, 12% w/v; alkoxylated propane triacrylate, 15% w/v; and a photoinitiator, 2% w/v.

What is claimed is:

1. A method of manufacturing a progressive optic, comprising the steps of:
   providing an optical preform having a first refractive index,
   a surface of the optical preform having a plurality of nested, spherical portions with centers of curvature located along a curve designed to minimize image displacement, each of the plurality of spherical portions having progressively varying radii;
   coating the spherical portions with an intermediate resin layer having a second refractive index which differs from the first refractive index;
   coating the optical preform having the intermediate resin layer with a superstrate resin layer; and
   polymerizing the intermediate and superstrate resin layers.

2. The method of claim 1, wherein the intermediate resin layer is partially polymerized after being coated onto the spherical portions.

3. The method of claim 1, wherein the second refractive index is about 0.03 to 0.05 units higher than the first refractive index.

4. The method of claim 1, wherein the thickness of the intermediate resin layer is approximately 1 to 2 microns.

5. The method of claim 1, wherein the spherical powers of adjacent spherical sections differ from each other by about 0.03 D to 0.06 D.

6. The method of claim 5, wherein the spherical powers of adjacent spherical sections differ from each other by about 0.03 D to 0.05 D.

7. The method of claim 1, wherein the superstrate resin layer is provided as an attached layer to a mold.

8. The method of claim 1, wherein said spherical portions are substantially concentric.

9. The method of claim 1, wherein said intermediate layer is at least partially polymerized before polymerizing said superstrate layer.

10. The method of claim 1, wherein the progressively varying radii of the plurality of spherical portions are progressively varying posterior radii.

* * * * *